United States Patent
Goncalves et al.

(10) Patent No.: US 7,285,515 B2
(45) Date of Patent: Oct. 23, 2007

(54) COMPOSITIONS OF OIL-BASED BIODEGRADABLE DRILLING FLUIDS AND PROCESS FOR DRILLING OIL AND GAS WELLS

(75) Inventors: José Thomaz Goncalves, Macaé (BR); Marcelo Fontes De Oliveira, Macaé (BR); Átila Fernando Lima Aragão, Macaé (BR)

(73) Assignee: Petroleo Brasileiro S.A. - Petrobras (BR)

( * ) Notice: Subject to any disclaimer, the term of this patent is extended or adjusted under 35 U.S.C. 154(b) by 209 days.

(21) Appl. No.: 10/341,253

(22) Filed: Jan. 14, 2003

(65) Prior Publication Data

US 2004/0002427 A1     Jan. 1, 2004

(30) Foreign Application Priority Data

Jun. 21, 2002     (BR) .................................. 0202361

(51) Int. Cl.
*C09K 8/36*     (2006.01)

(52) U.S. Cl. ..................... 507/103; 507/119; 507/137; 507/138; 507/140

(58) Field of Classification Search ................ 507/103, 507/119, 137, 138, 140
See application file for complete search history.

(56) References Cited

U.S. PATENT DOCUMENTS

| | | |
|---|---|---|
| 4,631,136 A | 12/1986 | Jones, III |
| 5,232,910 A | 8/1993 | Mueller et al. |
| 5,252,554 A | 10/1993 | Mueller et al. |
| 5,710,111 A * | 1/1998 | Van Slyke .................. 507/137 |
| RE36,066 E | 1/1999 | Mueller et al. |
| 6,218,342 B1 | 4/2001 | Patel |
| 6,589,917 B2 * | 7/2003 | Patel et al. .................. 507/138 |
| 6,838,082 B2 * | 1/2005 | Growcock et al. ......... 424/93.7 |

* cited by examiner

*Primary Examiner*—Philip C. Tucker
(74) *Attorney, Agent, or Firm*—Nixon & Vanderhye PC

(57) ABSTRACT

Compositions of oil-based biodegradable drilling fluids are described, the compositions comprising an oil phase composed by methyl esters of soybean oil fatty acids, an aqueous phase finely dispersed in the oil phase by specific emulsifiers and several other additives having specific functions for providing suitable performance to the finished drilling fluid composition. The process to manufacture the inverted emulsion and the drilling process that employs the compositions of the invention are described too.

35 Claims, 2 Drawing Sheets

TEMPERATURE (° C)

COMPOSITIONS OF OIL-BASED BIODEGRADABLE DRILLING FLUIDS AND PROCESS FOR DRILLING OIL AND GAS WELLS

FIELD OF THE INVENTION

The present invention relates to compositions of oil-based biodegradable drilling fluids, where the main oil-phase component is a mixture of methyl esters from biodegradable fatty acids, having a performance especially suitable to drilling operations.

Further the invention relates to a process for drilling oil and gas wells using the oil-based compositions of the invention.

BACKGROUND OF THE INVENTION

Drilling fluids, or drilling muds, are used in the drilling operations of oil and gas wells in order to lubricate and to cool the drill bit and its fittings, during rock penetration and, at the same time, to keep rock cuttings in suspension while at the same time carrying same out of the borehole.

In addition to those basic functions, drilling fluids must be able to be in charge of several other requested jobs during the drilling procedure and, to have it successfully done, some desirable physical and chemical properties are required, as, for example:

a) the variation of the drilling fluid viscosity with temperature should be small enough to allow such fluids, when submitted to a considerable temperature variation, like those that usually happen in the off shore deep water drilling, to be quickly recirculated throughout the whole system, with no overcharging for the pumping system;

b) inside the well, the gel strength of the drilling fluid should be sufficient to hold in suspension the rock cuttings produced during drilling, if, eventually, the circulation of the drilling system is stopped;

c) the density of the drilling fluid should be high enough to exert suitable pressure on the borehole sides to prevent the entrance of fluids from the earth formation into the borehole;

d) the fluid should be able to form an impervious filter cake, or deposit, on the bore side of the hole, in order to prevent undue loss of fluid into the earth formation.

Broadly, drilling fluids may be oil-based or water-based liquid systems.

For a particular use, the choice of one kind of drilling fluid involves a careful balance among the advantages and disadvantages of each one of them, where the conditions of the well to be drilled as well as the characteristics of the oil and gas field to be perforated are of paramount importance.

Among the advantages it can be said that oil-based fluids promote: a) better well stability, especially in the case of clayish formations; b) formation of a thinner filter cake than that observed in the case of water-based fluids; c) more effective penetration in salt formations without causing washout or enlargement of the borehole and other benefits well-known to those skilled in the drilling art.

The most beneficial property of the said oil-based fluids is their ability to lubricate the drill string and the bottom well tools. Based on such property it is possible to drill highly inclined wells, as is typically done in deep water offshore drilling, or horizontal wells drilling.

In those highly inclined wells, the drilling tubes are placed on the well bottom and therefore the contact with the rock is very much increased, requiring a higher force to rotate the drill string and, consequently, exerting more torque over the drill string structure.

Under these circumstances, the best way to preserve the mechanical strength of the drill string and avoid its sticking to the rock is to make use of oil-based fluids, since they provide a thin layer of lubricant between the rock and the drill string, making those contacts softer.

In spite of that many advantages of the oil-based fluids, they bear some disadvantages.

In general, oil-based drilling fluid operations are highly costly and more difficult to proceed than those employing water-based drilling fluids.

Depending upon the hole depth, such costs can become significant. Nevertheless, the use of those fluids is preferred based on statistic data indicating that they can prevent the occurrence of the well washout and enlargement, those factors leading to longer drilling operation duration and, consequently, rendering them more expensive.

The disposal of the oily cutting rocks produced in such type of operation is another problem, mainly when it is done in offshore drilling. In this case, the said oily cutting rocks must be washed with non-polluting detergents or transported onshore before being suitably disposed off or otherwise recovered.

Increasingly stringent regulations on the adverse environmental effects of the drilling fluids require the development of non-polluting substitutes.

Oil-based drilling fluids are inverted emulsions made up from a three-phase system comprising, basically, an oil, water and thinly divided solids which are complemented by specific emulsifiers, or emulsifier systems, alkaline compounds, weighting agents, fluid loss controlling agents and viscosity regulators. Such compounds are used to stabilize the overall system while providing the properties required for the adequate performance of the drilling fluid.

A huge number of oil-based drilling fluid compositions have been described in the literature.

When such oil-based drilling fluids are designed to be non-polluting, particularly, when they have to be used in offshore operations, the main concern is focused on the oil phase properties, because it is the main responsible component for the biodegradability properties of the overall composition.

Current compositions of biodegradable oil-based drilling fluids make increased use of esters prepared from the reaction of vegetable oil fatty acids with monoalcohols as the oil phase since the intrinsic non-polluting properties of the vegetable oils are preserved in the final product.

As an example, U.S. Pat. No. 4,631,136, U.S. Pat. No. 5,232,910 and U.S. Pat. No. 5,252,554 teach the use of selected fatty acid esters from vegetable oils in formulations of oil-based drilling fluids, but restricts, in the claims, the ester molecules to those bearing from two to twelve carbon atoms in their alcohol moiety.

U.S. Pat. No. 6,218,342 too teaches the use of the same kind of esters in the composition of an oil-based drilling fluid presented in Example 7.

However, the experimental evidence presented by those patents is based only on laboratory tests while the Applicant interest is directed to using such formulations in very deep water (above 1000 m water depth) drilling operations where the variation of the fluid temperature may reach up to 46° C., with the consequent strong viscosity increase that renders more difficult to bring the fluid up to the platforms and there separate the cutting rocks. Augmented viscosity further promotes a considerable increase in the pumping pressure.

Very deep water drilling requires therefore an improvement in oil-based drilling fluid compositions. Such compositions as well as the drilling process making use of same are described and claimed in the present invention.

SUMMARY OF THE INVENTION

The present invention relates to compositions of oil-based biodegradable drilling fluids, the compositions involving inverted emulsions specifically formulated to be compatible with the oil phase, said compositions comprising, on a weight basis:

a) of from 48 to 75% of a continuous oil phase essentially made up of fatty acid methyl esters of natural source oils;

b) of from 22 to 42% of an aqueous phase compounded with a finely dispersed alkali metal halide;

c) of from 2 to 8% of, at least, one emulsifying agent consisting essentially of fatty acid soaps able to form an oil-in-water emulsion;

d) of from 0.5 to 1.0% of a viscosifying agent of the organophilic clay type;

e) of from 0.1 to 0.5% of at least one fluid loss polymeric additive selected from the class of polyacrylates and related products;

f) of from 0.1 to 0.5% of at least one antioxidant additive as 2,6,di-tert-butyl-p-cresol (DBPC);

g) of from 1 to 3% of a metal oxide able to cause an alkaline reaction in order to produce in situ fatty acid soaps while at the same time providing an alkaline reserve to the compositions.

Optionally, according to the well drilling operation conditions, it can be used yet:

a) of from 0.1 to 10% by weight of d-limonene as a pour point depressant;

b) of from 0.1 to 0.5% by weight of sodium polyacrylate as an auxiliary additive to the fluid loss polymeric additive;

c) of from 6 to 14% by weight of calcium carbonate as a sealant agent and d) of from 0.1 to 25% by weight of barium sulfate as filler.

The present invention relates further to the drilling process of oil and gas wells where the described oil-based drilling fluid compositions will be used.

One of the objectives of the present invention is to provide compositions of biodegradable oil-based drilling fluids suitable to deep water drilling operation.

The present invention provides further oil-based drilling fluids specifically formulated to keep itself as a liquid, even though at the low temperatures of the bottom sea.

Another objective of the present invention is to provide biodegradable compositions of drilling fluids, suitable to be used in offshore drilling operation, the compositions being formulated with environmentally-friendly components.

Further, the present invention provides less expensive operations, since the compositions allow using lower ester/brine ratios, in the range of 60/40 w/w, the usual range being 70/30 w/w, the ester component being responsible for, at least, 80% of the final costs of the compositions.

The present invention provides also a process for drilling oil and gas wells where the compositions mentioned herein are used in deep water operations (above 400 m water depth).

BRIEF DESCRIPTIONS OF THE DRAWINGS

FIG. 1 attached illustrates a comparison of the temperature effect over apparent viscosity of a drilling fluid composition according to the invention including d-limonene.

FIG. 2 attached illustrates a comparison of the temperature effect over the gellification trend of a drilling fluid composition according to the invention which includes d-limonene.

DETAILED DESCRIPTION OF THE INVENTION

The oil-based drilling fluid compositions (or drilling fluids) of the present invention are oil-in-water emulsions, or inverted emulsions, designed to promote non-polluting and optimized operations of oil and gas well drilling in deep or very deep waters.

The oil phase of the inverted emulsion is essentially constituted of fatty acid methyl esters of oils from natural sources, therefore, biodegradable and non-toxic to sea and animal life.

The amount of these fatty acid methyl esters is added to the emulsion in concentrations that can vary of from 48 to 75% by weight, but remains, preferably, in the range of 55 to 65% by weight.

For the purposes of the present invention, the oils from natural sources may be animal or vegetable oils, but preferably, vegetable oils.

The preferred vegetable oils to be used as fatty acid source to synthesize the said methyl esters employed as the oil phase of the emulsion are soybean, castor, corn, cottonseed, rapeseed and peanuts oil, or admixtures of same, in any amount.

The most preferred vegetable oil is pure soybean oil. Soybean oil methyl esters are commercially available and offered by many suppliers.

On the other hand, fish oil is an useful animal source of the said fatty acids.

Calcium chloride can be used for thickening the aqueous phase to be finely dispersed in the oil phase, but preferably, an alkaline solution of an alkali metal halide as sodium or potassium chloride is used. The most preferred is a saturated solution of sodium chloride that can be added to the compositions in the amount of from about 22 to 42% by weight, but preferably is used in the amount from 26 to 30% by weight.

Useful products to be used as emulsifiers are those indicated by their suppliers as technically suitable to promote inverted emulsions when admixed to the components of the present invention; however, the fatty acids soaps, in amounts that vary from 2 to 8% by weight are preferred.

Particularly, the present invention employs the said soaps, which however are not added as a finished product. Rather, in a patentably distinguishing feature, those are produced "in situ", during the manufacturing of the emulsion, by neutralizing the free fatty acids of, to cite an example, a commercial product called LIOVAC 2975-NT, with alkaline reaction metal oxides, in an amount sufficient to keep the emulsion pH in the range of from 9 to 10. LIOVAC 2975-NT is a Miracema Nuodex commercially available product, constituted by a mix of non-specific amines, amides and free fatty acids from crude soybean oil, having a Total Acid Number (TAN) in a range of from 100 to 110 mg KOH/g.

Usually, metal oxide amounts added to the formulation vary of from 1 to 3% by weight, when the amounts of the said LIOVAC product cited as an example vary of from 3 to 6% by weight.

When the pH values of the final emulsion are higher than 10, pH may be corrected by adding citric acid, since at such high levels of alkalinity, the esters become more susceptible to hydrolysis and the products of that reaction affect the stability of the emulsion, this being very detrimental to the performance of the drilling fluid formulations.

However, pH values lower than 9 should be avoided too, because it is necessary to keep an alkaline reserve in the formulation, in order to protect the drill string from corrosion caused by the action of the acid compounds that are a common presence in drilling operations, particularly the gaseous ones, like $CO_2$ and $H_2S$.

Metallic oxides useful to promote said alkaline reserve are the zinc, calcium, magnesium or aluminum oxides, with magnesium oxide being preferred in the present invention, since it is less soluble in the aqueous phase and thus, can affect the organic phase. This contributes to the delaying of the ester alkaline hydrolysis as well as to the oxidation of the linoleic and linolenic acid double bonds present in soybean oils.

The control of the oxidation reactions is a very important feature in drilling operation, since those reactions are at least in part responsible for the increase in drilling fluid viscosity which if occurring at the low temperatures of the sea bottom may hinder circulation of the drilling fluid.

According to the present invention, addition of antioxidant additives to the formulations makes possible the control of the said oxidation reactions.

Useful antioxidant additives are: butylated-hydroxy-anisole (BHA), butylated-hydroxy-toluene (BHT) or tert-butyl-hydroquinone (TBHQ), but preferably, 2,6,di-tert-butyl-p-cresol (DBPC). The range employed varies of from about 0.1 to 0.5% by weight.

Citric acid is also added as an antioxidant synergist in amounts that vary of from 0.5 to 1.0% by weight.

In order to be stabilized, the ester-based inverted emulsions need a very strong shear mixing. A common occurrence is a fast phase separation when the shear mixing of the emulsion is interrupted, with serious consequences if it happens during a drilling operation.

To be protected at least in part from the said problem of phase separation, the present invention make uses of auxiliary emulsifier agents, preferably, additives based upon esters of hydrogenated castor oil, as, for example, LIOVAC 1115, an available commercial product of the Miracema Nuodex Industria Quimica Ltda., that is able to keep the emulsion stable when used in the range of concentration from 0.1 to 2.5% by weight.

As concerns the filter cake formation, the present invention makes use as a main fluid loss control agent of a synthetic copolymer based upon succinimide polyacrylates, as for example, PLIOLITE DF1, a Goodyear product, in concentrations that vary of from 0.1 to 2.5% by weight. As a secondary agent, sodium polyacrylates are employed, as for example LIOVAC 510 (Miracema Nuodex) in the same concentration ranges as those of the succinimide polyacrylates.

When it is necessary to optimize the flow characteristics of the drilling fluid at the low temperatures of the sea bottom, d-limonene is added to the composition. D-limonene is a natural source organic compound having pour point depressant properties. For the objectives of the invention, amounts of d-limonene may vary of from 0.1 to 10% by weight.

Figure 1:
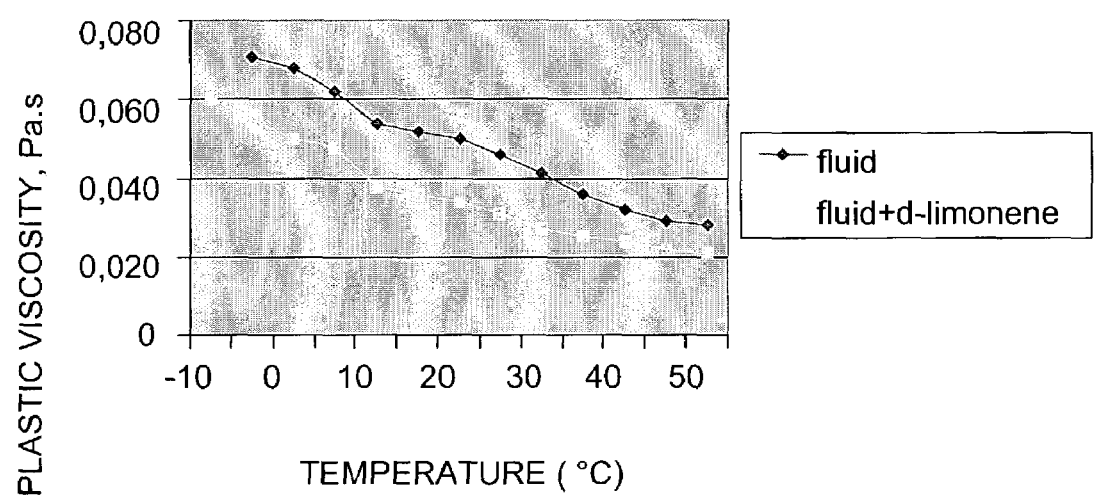
FIG. 1 shows that said d-limonene additive, when used in the present invention in an optimized concentration, is able to keep, at all temperatures showed in the figure, the fluid viscosities lower than the reference fluid which is a fluid with the same composition, but, having no pour point depressant additive.
Figure 2:
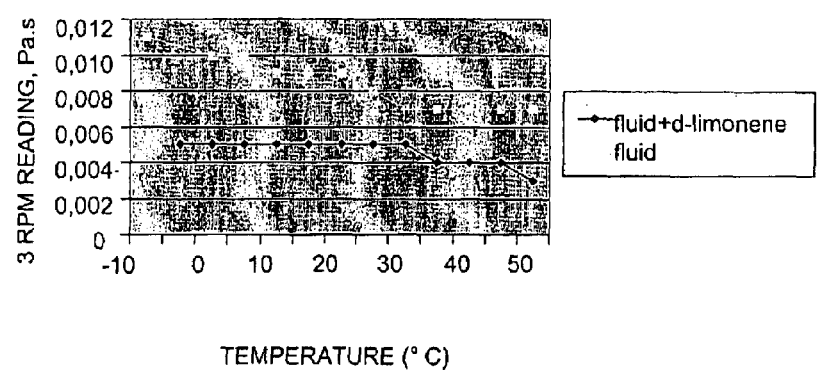
FIG. 2 shows that the composition including the pour point depressant additive d-limonene, shows lower shearing rate than the reference fluid, at all the temperatures of the Figure. It is noticed that differences between viscosities of the two fluids become increasingly higher, as temperatures go down, and, when temperatures are lower than ambient, such differences became more significant.

With regard to the adjustment of the drilling fluid viscosity, one or more viscosifying agents may be employed. In the present compositions, useful as viscosifying agents are the organophilic clays, as for example, UG 69, supplied by MI Drilling Fluids, or the GELTONE 2, supplied by Baroid, in concentrations that may vary of from 0.5 to 1.0% by weight.

The present compositions further include weighting agents, that are preferably acid soluble, as for example, barium sulfate, in concentrations that may vary of from 0.1 to 25% by weight.

Depending upon the characteristics of the well to be drilled it may be necessary to use sealing agents, as for example, calcium carbonate, that is also acid soluble, the sealant being employed in concentrations that may vary of from 6 to 14% by weight.

It is important to work with acid soluble agents, since such characteristics tend to make easier the further operations of putting in production the horizontal wells. Such operations make use of an acid treatment to break down the filter cakes that remain at the surface of the borehole walls.

According to the principles of the invention, the oil-based drilling fluids described herein are prepared using state-of-the-art standard equipment and emulsion manufacturing procedures, such procedures comprising the steps of:

a) pouring into a suitable mixer a desired amount of the esters and, if necessary, d-limonene;

b) adding, under mixing, the whole amount of emulsifier;

c) adding half of the required amount of magnesium oxide;

d) adding a desired amount of brine while keeping the mixer working for the period of time necessary to homogenize the mixture, the operation lasting as long as two hours;

e) adding the other half of the required amount of magnesium oxide;

f) adding a desired amount of the main fluid loss additive (the auxiliary one will be added at the platform);

g) adding a desired amount of the viscosifying agent;

h) at the end of the procedure, collecting and analyzing in the laboratory a sample of the mixture and, if it matches the specification, transferring it immediately to the tanks of a tugboat which will deliver the mixture to a designed platform;

i) optionally adding to the composition the sealing and weighting agents only in the mixing tanks of the platform.

The calculation for dimensioning the fluid volume to be used in a determined drilling operation considers the well geometry, the oil producing interval as well as the Applicant's expertise.

Analogously, the concentration range of some components of the mixture is determined from the physical-chemical characteristics that should be exhibited by the compositions in order that they comply with the specific requirements of the requested job.

As an example, the viscosity and the density ranges of the drilling fluid are specified on the basis of data acquired from mathematical and/or mechanical simulators, developed in the Research Center of the Applicant, such simulations using actual, field measurements, as well as temperatures, reservoir pressure and soil permeability.

Therefore, it can be pointed out that the compositions of the present invention do not have a well-defined formulation, with the concentration of their components being presented as a range in the tables, since they may vary during operations and have to be constantly monitored and adjusted to keep the properties of the drilling fluids at all times suitable to the performance requirements of the operations.

Thus, it may be stated that the compositions of the present invention are of a dynamic nature, since the amounts of same are continuously modified and adjusted throughout the well drilling operations.

It is further pointed out that the overall design of the inventive compositions is such as to make them compatible with the ester which makes up the continuous phase of the inverted emulsion, the invention being mainly focused on such ester, since it is thanks to it that the drilling of oil and gas wells has been rendered more effective and environmentally friendly.

The compositions of the present invention are unique because in a patentably distinguishing way, by combination and balance, the various components are made compatible so that the emulsion is kept in a stable state.

Advantageously, the gel strength is sufficient to keep the solid cuttings produced by the drilling operation in a suspended state, and this, in spite of the fact that the compositions contain an ester the viscosity of which is lower than that of state-of-the-art esters as well as being susceptible to deterioration by outer components, this susceptibility being caused by the considerable reactivity of its molecules.

It should be understood that various other components, of similar behavior as compared to those specifically cited in the present specification, may be used in the drilling fluid compositions of the invention, provided they are similarly compatible with the methyl esters which make up the oil phase of the present compositions. Therefore, this aspect should not be construed as limiting the invention.

Below it is described how the compositions of the present invention are used in a drilling process, wherein such process comprises the following steps:

a) specifying the range of physical-chemical characteristics of the drilling fluid, using data acquired by the mathematical and mechanical simulators, information about the well drilling conditions besides the expertise of the drilling operator;

b) based on a), designing the possible compositions, which are then prepared and tested in the laboratory to select the most suitable compositions to the job;

c) preparing the desired amount of the selected composition(s) in an industrial mixing plant;

d) pumping, at the end of the preparation, the finished mixture to the tanks of the tugboat bound to the platform where the operation is supposed to be made in;

e) transferring the drilling fluid to the drilling fluid tanks of the platform where they are kept under agitation until the very moment of the beginning of the operation when the fluid loss additives, the weighting and, eventually, the sealant agent are added to the drilling fluid mixture;

f) starting the drilling operation, which is kept on duty in accordance with standard procedures well known in the art;

g) at the end of the drilling operation, bringing the amount of the remainder fluid back to the mixing plant to be treated and reutilized in further operations.

The present invention will now be illustrated by the following examples, which should not be considered as limiting it.

EXAMPLE 1

Five Campos Basin wells were chosen to be drilled with the drilling fluids of the invention. The main characteristics of the operation performance of these wells are shown below in Table 1.

TABLE 1

| Well number | Water depth, m | Expected penetration rate, m/h | Obtained penetration rate, m/h | Final depth, m |
|---|---|---|---|---|
| 1 | 194 | 14 | 15.4 | 2850 |
| 2 | 194 | 14 | 17.4 | 2912 |
| 3 | 750 | 25 | 25.8 | 3215 |
| 4 | 800 | 25 | 23.9 | 3120 |
| 5 | 1100 | 22 | 28.8 | 3005 |

Table 2 below shows the concentration ranges of the components used in the drilling fluid compositions employed in each of the tests carried out in the wells of Table 1.

The relationships composition/well were the following:
a) Composition n° 1 was tested in well number 1;
b) Composition n° 2 was tested in well number 2;
c) Composition n° 3 was tested in well number 3 and
d) Composition n° 4 was tested in wells number 4 and 5.

It should be pointed out that Compositions n° 3 and n° 4 were formulated at a higher ester/water ratio than all the others (Composition n° 4 reached a ratio of 75/25). Also d-limonene was added to keep the pour point characteristics of the fluid within the range specified for the low temperatures of the sea bottom, which were around 10 and 4° C.

TABLE 2

| Components | Composition 1 (Weight %) | Composition 2 (Weight %) | Composition 3 (Weight %) | Composition 4 (Weight %) |
|---|---|---|---|---|
| Methyl esters of soybean oil | 48 to 52 | 58 to 62 | 55 to 70 | 50 to 75 |
| d-limonene | — | — | 01 to 5 | 01 to 10 |
| DBPC | 0.1 to 0.5 | 0.1 to 0.5 | 0.1 to 0.5 | 0.1 to 0.5 |
| LIOVAC 1115 | 0.1 to 2 | 1 to 3 | 0.3 to 1 | 0.3 to 1 |
| LIOVAC 2975-NT | 3 to 6 | 3 to 6 | 3 to 6 | 3 to 6 |
| Magnesium oxide | 1 to 3 | 1 to 3 | 1 to 3 | 1 to 3 |
| NaCl Brine | 36 to 42 | 32 to 36 | 26 to 30 | 22 to 26 |
| Organophilic clays | 0.5 to 1 | 0.5 to 1 | 0.5 to 1 | 0.5 to 1 |
| Polyacrylate of succinimide copolymer | 0.1 to 0.5 | 0.1 to 0.5 | 0.1 to 0.5 | 0.1 to 0.5 |
| Sodium polyacrylate | 0.1 to 0.5 | 0.1 to 0.5 | 0.1 to 0.5 | 0.1 to 0.5 |
| Citric acid | 0.1 to 1.5 | 0.1 to 1.5 | 0.1 to 1.5 | 0.1 to 1.0 |
| Barium sulfate | 0.1 to 25 | 0.1 to 25 | 0.1 to 25 | 0.1 a 25 |

Tables 3 and 4 below show the variation ranges of the results obtained during drilling operation of the Table 1 wells.

It can be seen that for all compositions, results are within the limits reported by prior art tests relative to:

a) Plastic viscosity (PV) at 50° C.=60 mPa.s (0.060 Pa.s) max. (U.S. Re. 36,066, Claim 6);

b) b) Yield point (YP) at 50° C.=40 mPa.s (0.019 KPa) max. (U.S. Re. 36,066, Claim 33).

Therefore, based on the results shown in Tables 1 to 4, obtained during the laboratory monitoring of the test fluids, in effective field tests, it can be affirmed that the performance of the drilling fluid compositions of the invention has been completely satisfactory, if it is considered that:

TABLE 3

| TESTS (API STANDARD RP 13 B) | RESULTS AT 50° C. (1) | | | |
|---|---|---|---|---|
| | COMP. 1 | COMP. 2 | COMP. 3 | COMP. 4 |
| Density, Kg/m³ (ppg) | 1018 to 1198 (8.5 to 10) | 1018 to 1198 (8.5 to 10) | 995 to 1198 (8.3 to 10) | 970 to 1198 (8.1 to 10) |
| Plastic Viscosity, Pa · s (cP) | 0.025 to 0.040 (25 to 40) | 0.025 to 0.040 (25 to 40) | 0.025 to 0.035 (25 to 35) | 0.025 to 0.030 (25 to 30) |
| Yield Point, kPa (Lbf/100 ft²) | 0.007 to 0.021 (15 to 45) | 0.007 to 0.021 (15 to 45) | 0.007 to 0.017 (15 to 35) | 0.007 to 0.014 (15 to 30) |
| Initial gel strength, kPa (Lbf/100 ft²) | 0.004 to 0.009 (8 to 20) | 0.004 to 0.009 (8 to 20) | 0.004 to 0.007 (8 to 15) | 0.004 to 0.007 (8 to 15) |
| Final gel strength, kPa (Lbf/100 ft²) | 0.004 to 0.014 (8 to 30) | 0.004 to 0.014 (8 to 30) | 0.004 to 0.009 (8 to 20) | 0.004 to 0.009 (8 to 20) |
| Fluid loss HPHT, ml | 2 to 8 | 2 to 8 | 2 to 8 | 2 to 8 |
| PM, ml of $H_2SO_4$ 0,05 N | 2 to 3 | 2 to 3 | 2 to 3 | 2 to 3 |
| Electrical stability, V | 100 to 400 | 100 to 400 | 100 to 400 | 100 to 400 |

Obs.: (1) mean temperature of the well.

TABLE 4

| TESTS (API STANDARD RP 13 B) | RESULTS | | | |
|---|---|---|---|---|
| | COMP. 1 15° C. (1) | COMP. 2 13° C. (1) | COMP. 3 10° C. (1) | COMP. 4 4° C. (1) |
| Density, Kg/m³ (ppg) | 1018 to 1198 (8.5 to 10) | 1018 to 1198 (8.5 to 10) | 1018 to 1198 (8.5 to 10) | 1018 to 1198 (8.5 to 10) |
| Plastic Viscosity, Pa · s (cP) | 0.030 to 0.045 (30 to 45) | 0.030 to 0.045 (30 to 45) | 0.035 to 0.050 (35 to 50) | 0.040 to 0.055 (40 to 55) |
| Yeld Point, kPa (Lbf/100 ft²) | 0.012 to 0.021 (25 to 45) | 0.014 to 0.021 (30 to 45) | 0.014 to 0.024 (30 to 50) | 0.014 to 0.024 (30 to 50) |
| Initial gel strength, kPa (Lbf/100 ft²) | 0.007 to 0.014 (15 to 30) | 0.007 to 0.014 (15 to 30) | 0.010 to 0.021 (20 to 45) | 0.010 to 0.024 (20 to 50) |
| Final gel strength, kPa (Lbf/100 ft²) | 0.010 to 0.014 (20 to 30) | 0.010 to 0.014 (20 to 30) | 0.012 to 0.019 (25 to 40) | 0.014 to 0.024 (30 to 50) |
| Fluid loss HPHT, ml | 2 to 8 | 2 to 8 | 2 to 8 | 2 to 8 |
| PM, ml of $H_2SO_4$ 0,05 N | 2 to 3 | 2 to 3 | 2 to 3 | 2 to 3 |
| Electrical stability, V | 100 to 400 | 100 to 400 | 100 to 400 | 100 to 400 |

Obs.: (1) mean temperature of the bottom sea.

a) the expected penetration rates shown in Table 1 have been estimated on the basis of a drilling operation where the drilling fluids would be prepared from a well-known commercial n-paraffin oil-based drilling fluid, and the results of the obtained penetration rate were practically the same;

b) all the experimental wells in Table 1, were drilled without any report of loss of stability of the test fluids;

c) all the experimental wells in Table 1 were drilled without any report of irregular sticking of the drill string, indicating the suitability of the fluid lubricity and d) in Well 1, it was possible to go down into the well a tool by cable, in a 69° inclination while, normally, this kind of operation can only be conducted until a 60° inclination. This is an indication that the well was free of roughness, which means that the drilling fluid compositions of the invention had good lubricity characteristics.

What is claimed is:

1. Compositions of biodegradable oil-based drilling fluids, the compositions being inverted emulsions specifically formulated to be compatible with the oil phase, wherein such compositions comprise, on a weight basis:
   a) of from 48 to 75% of a continuous oil phase essentially made up of fatty acid methyl esters of natural source oils;
   b) of from 22 to 42% of an aqueous phase compounded with a finely dispersed alkali metal halide;
   c) of from 2 to 8% a of at least, one emulsifying agent consisting essentially of fatty acids soaps suitable to yield an oil-in-water emulsion;
   d) of from 0.5 to 1.0% a of a viscosifying agent of the organophilic clays type;
   e) of from 0.1 to 0.5% of, at least, one fluid loss polymeric additive, from the class of polyacrylates;
   f) of from 0.1 to 0.5% of, at least, one antioxidant additive selected from the group consisting of butylated-hydroxy-anisole (BHA), butylated-hydroxy-toluene (BHT), tert-butyl-hydroquinone (TBHQ), and 2,6, di-tert-butyl-p-cresol (DBPC);
   g) of from 1 to 3% a of a metallic oxide able to cause an alkaline reaction in order to produce in situ the fatty acids soaps and provide an alkaline reserve to the compositions.

2. The compositions of claim 1, wherein the compositions additionally comprise a pour point depressant additive.

3. The compositions of claim 2, wherein the pour point depressant additive is d-limonene, in concentrations of from 0.1 to 10% by weight.

4. The compositions of claim 1, wherein the compositions additionally comprise a barium salt as weighting agent.

5. The compositions of claim 4, wherein the barium salt is barium sulfate in concentration of from 0.1 to 25% by weight.

6. The compositions of claim 1, wherein the compositions additionally comprise a sealing agent.

7. The compositions of claim 6, wherein the sealing agent is calcium carbonate in a concentration of from 6 to 14% by weight.

8. The compositions of claim 1, wherein the natural source oil is of animal origin.

9. The compositions of claim 1, wherein the natural source oil is of vegetable origin.

10. The compositions of claim 9, wherein the vegetable oils used as fatty acid source to synthesize the said methyl esters employed as the continuous oil phase of the emulsion are soybean, castor, corn, cottonseed, rapeseed and peanuts oil, or admixtures of same, in any amount.

11. The compositions of claim 10, wherein the preferred source of fatty acid to synthesize the methyl esters is soybean oil.

12. The compositions of claim 11, wherein the amount of soybean oil methyl esters in the continuous oil phase a) is 55 to 65% by weight.

13. The compositions of claim 1, wherein the aqueous phase, having a finely dispersed alkali metal halide b) is made up of from 26 to 30% by weight of a saturated solution of sodium chloride.

14. The compositions of claim 1, wherein component c) further comprises a mixture of amines and amides, prepared from crude soybean oil.

15. The compositions of claim 14, wherein component c) further includes free fatty acids to allow "in situ" soap formation.

16. The compositions of claim 14, wherein component c) is present in concentration of from 3 to 6% by weight.

17. The compositions of claim 1, wherein the fluid loss additive of component e) is a copolymer of succinimide polyacrylate.

18. The compositions of claim 1, wherein component e) comprises at least two fluid loss additives, one of them being an auxiliary fluid loss additive.

19. The compositions of claim 18, wherein the auxiliary fluid loss additive is sodium polyacrylate in concentration of from 0.1 to 0.5% by weight.

20. The compositions of claim 1, wherein the compositions additionally comprise an auxiliary antioxidant additive of component f).

21. The compositions of claim 20, wherein said auxiliary antioxidant additive is citric acid in concentration of from 0.5 to 1% by weight.

22. The compositions of claim 1, wherein the "in situ" soap formation is obtained by adding the metallic oxides of component g), during the emulsion manufacturing.

23. The compositions of claim 22, wherein the metallic oxide of component g) is magnesium oxide.

24. The compositions of claim 22, wherein during the emulsion manufacturing, magnesium oxide, when added in excess to that required to form the "in situ" soaps, is in charge to promote the alkaline reserve necessary to keep the emulsion stability.

25. The compositions of claim 23, wherein the concentration of magnesium oxide is of from 1 to 3% a by weight.

26. The compositions of claim 25, wherein the control of the excess magnesium oxide is effected by adding citric acid in concentrations of from 0.1 to 1.5% a by weight.

27. The compositions of claim 1, wherein the pH of the emulsion is kept in the range of from 9 to 10.

28. The compositions of claim 1, wherein the compositions are prepared according to the following steps:
   a) pouring into a suitable mixer a desired amount of the esters and, if necessary, d-limonene;
   b) adding, under mixing, the whole amount of emulsifier;
   c) adding half of the required amount of magnesium oxide;
   d) adding a desired amount of brine while keeping the mixer working for the period of time necessary to homogenize the mixture, the operation lasting as long as two hours;
   e) adding the other half of the required amount of magnesium oxide;
   f) adding a desired amount of the main fluid loss additive; and
   g) adding a desired amount of the viscosifying agent.

29. The compositions of claim 28, wherein the components of such compositions are combined and balanced in order to keep the emulsion stabilized and with a gel strength enough to keep in suspension the solids produced in the drilling, even though in the presence of methyl esters of a lower relative viscosity and more susceptible to deteriorate by hydrolysis than other oil phase esters.

30. The compositions prepared in accordance with claim 28, wherein the compositions have a dynamic character, meaning that during the operation component amounts are continuously adjusted, to adapt the properties of the emulsion to the needs of the drilling operations.

31. The compositions prepared in accordance with claim 28, wherein the compositions additionally comprise at least one of a weighting agent and a sealing agent, and wherein the compositions are prepared according to the further steps of
   h) collecting and analyzing in the laboratory a sample of the mixture and, if it matches the specification, transferring it immediately to tugboat tanks which will deliver the mixture to a designed platform; and
   i) adding to the composition the sealing and weighting agents only in mixing tanks of the platform.

32. The compositions prepared in accordance with claim 28, wherein d-limonene is added on shore to the compositions, together with the esters, in the mixers of a mixing plant.

33. A process for drilling oil and gas wells, with the aid of the compositions formulated according to claim 1, wherein the process comprises the following steps:
   a) specifying the range of physical-chemical characteristics of the drilling fluid including at least one of viscosity and density, starting from data acquired by mathematical and mechanical simulators which estimate well drilling conditions for each well to be drilled;
   b) preparing a desired amount of fluid composition, without weighting and sealing agents, which will be added to the tanks at a local drilling operation in order to provide the fluid composition with the physical-chemical characteristics determined in a);
   c) pumping said fluid composition prepared in b) to the tanks at the local drilling operation and adding and mixing a weighting agent and, eventually, sealing agent;
   d) starting the drilling operation using said fluid composition;
   e) gathering and recovering the non-utilized fluid composition as prepared in b) for future operations.

34. The compositions prepared in accordance with claim 31, wherein the weighting and sealing agents are added to the compositions in tanks of a local drilling operation, just before using the compositions in the operation.

35. The compositions of claim 1, wherein the antioxidant additive is 2,6, di-tert-butyl-p-cresol (DBPC).

* * * * *